3,144,395
PROCESS FOR PREPARING 6-AMINOPENICIL-
LANIC ACID BY *BACILLUS MEGATERIUM*
Sawao Murao, Osaka, and Kinichiro Sakaguchi and Kageaki Kono, Tokyo, Japan, assignors to Olin Mathieson Chemical Corporation, New York, N.Y., a corporation of Virginia
No Drawing. Filed Apr. 17, 1963, Ser. 273,542
Claims priority, application Japan Aug. 1, 1962
4 Claims. (Cl. 195—36)

This invention relates to a new process for preparing 6-aminopenicillanic acid and more particularly to an improved method for preparing 6-aminopenicillanic acid by enzymatic hydrolysis of penicillins.

6-aminopenicillanic acid is a known compound of proven utility as an intermediate in the preparation of penicillins. The conversion to penicillins can be simply effected by treating 6-aminopenicillanic acid with the desired acylating agent in the presence of a catalyst. Prior to this invention 6-aminopenicillanic acid had been prepared by the enzymatic hydrolysis of penicillins. Unfortunately, however, those microorganisms previously known to effect such conversion suffered from one or more disadvantages, such as their failure to hydrolyze difficultly hydrolyzable penicillins, such as penicillin G; their production of the enzyme penicillinase which destroys the penicillin nucleus; and the difficulty in separating the desired penicillin amidase (penicillin acylase)[1] enzyme from the mycelium of the microorganism by which it was formed.

It has now been found that by using two hithertofore unknown strains of the species *Bacillus megaterium*, all of these disadvantages are obviated and a commercially feasible method for preparing 6-aminopenicillanic acid from penicillins is achieved. One of the new strains is identified by the name *Bacillus megaterium* var. *penicillalyticum*. This microorganism has been deposited with the American Type Culture Collection in Washington, D.C., wherein it has been assigned the number ATCC 14945. The other new strain is identified by the name *Bacillus megaterium* var. *noncitrovorum*. This microorganism has also been deposited with the American Type Culture Collection, wherein it has been assigned the number ATCC 14946.

These new strains of *Bacillus megaterium* can be distinguished from known strains of this species by the following comparisons:

*Bacillus Megaterium* var. *Penicillalyticum*

*Morphology.*—The large diameter of the rods ($1.0\mu$ to $1.3\mu$), the formation of fat, the granular appearance in the cell, the form of sporangia, and the character of the growth are the same as in the known *B. megaterium*, but the strain differs in the following respects:

(1) The length of the rods ($2.5\mu$ to $6.0\mu$) is longer than the known *B. megaterium*.
(2) No spores are formed on nutrient agars.
(3) Chromogenesis is different (no browning with pellucid dots on aging).
(4) Cultures fail to grow well on glucose-nitrate agars.

*Physiology.*—In the following properties the strain is the same as known strains of *B. megaterium*: failure to produce acetylmethylcarbinol; forms acid from mannitol; no anaerobic growth in glucose broth; and hydrolyzes starch. It differs in the following respects:

(1) Cannot peptonize milk.
(2) Reduces nitrates to nitrites.
(3) Unable to ferment arabinose and xylose.

---
[1] This change made at American Consulate General, Osaka, Japan, April 8, 1963.

*Bacillus Megaterium* var. *Noncitrovorum*

*Morphology.*—The large diameter of the rods ($1.0\mu$ to $1.1\mu$), the formation of fat, the granular appearance in the cell, the form of sporangia and most of the characteristics of growth are the same as in the known *B. megaterium*, but the strain differs in the following respects:

(1) The length of the rods ($3.0\mu$ to $7.0\mu$) is longer than the known *B. megaterium*.
(2) Only scant spore formation on nutrient agars.
(3) Chromogenesis is different (no browning with pellucid dots on aging).
(4) Cultures fail to grow well on glucose-nitrate agars.

*Physiology.*—In the following properties the strain is the same as known strains of *B. megaterium*: failure to produce acetylmethylcarbinol; formation of acid from mannitol; no anaerobic growth in glucose broth; and hydrolysis of starch. It differs in the following respects:

(1) Cannot utilize citrate.
(2) Weakly reduces nitrates to nitrites.
(3) Unable to ferment xylose.

The bacteriological properties of the two new strains are summarized in the following tables:

*Bacillus Megaterium* var. *Penicillalyticum*

I. Morphological observations:
  A. Microscopic observations:
    (a) Vegetative cells—When grown on nutrient agar at 30° C. for 18 to 24 hours, rods, $1.0\mu$ to $1.3\mu$ by $2.5\mu$ to $6.0\mu$, with rounded ends, usually occuring as filaments or long and tangled chains, but in a few cases occurring singly or in short chains. Motile with peritrichous flagella, Gram positive or Gram variable, no capsules (not acid fast). On glucose-nutrient agar, cells contain a few fat globules. Stained protoplasm granular. Occasional shadow-forms.
    (b) Spores—When inoculated onto nutrient agar spores are not formed, but when incubated on soybean agar (at 30° C. for 24 to 48 hours) numerous spores are formed. Size $0.8\mu$ to $1.2\mu$ by $1.5\mu$ to $2.0\mu$, ellipsoidal or oval, central or paracentral.
    (c) Sporangia—Not distinctly swollen.
  B. Nutrient agar slants (30° C. for 24 hours): Growth abundant, filiform, smooth, soft to butyrous, translucent to opaque, glistening, milky white to slightly yellowish white, chromogenesis unchanged on aging and no browning with pellucid dots on aging, color of medium unchanged, putrid odor.
  C. Nutrient agar plate colonies: Circular, surface rough, edge slightly undulated, soft, glistening, milky white to slightly yellowish white, slightly adherent, no spreading.
  D. Nutrient broth (30° C. for 24 hours): Turbidity medium to slightly uniform with scanty sediment, no pellicle.
  E. Glucose-nitrate agar slants: No growth or very scant.
  F. Tyrosine agar slants (30° C. for 24 to 72 hours): Deep black pigment produced.
  G. Soybean agar slants: Growth abundant, as well as on nutrient agar, better sporulation, smooth, white, glistening or occasionally nacreous to iridescent.
  H. Glucose-nutrient agar slants (30° C.): Growth usually more abundant (somewhat slimy) and softer than on nutrient agar.
  I. Potato plug: Growth abundant, smooth, glistening, spreading, usually white to creamy white (but pale to pink on aging occasionally), color of medium becomes yellowish brown on aging.
J. 7% NaCl broth (30° C.): No growth.
K. 5% NaCl broth (30° C.): No growth or scant growth.

II. Physiological properties (incubation temperature 30° C.):
A. Oxygen: Aerobic (no anaerobic growth in glucose broth).
B. Litmus milk: Production of alkalinity; non-peptonized.
C. Gelatin stab: Slow liquefaction, crateriform (hydrolysis of gelatin: Positive).
D. Gelatin agar streak plate: Narrow zone of hydrolysis (Frazier gelatin agar plate).
E. Milk agar streak plate: Narrow zone of hydrolysis of casein (hydrolysis of casein: Positive).
F. Hydrolysis of starch: Positive.
G. Production of acetylmethylcarbinol: Negative (incubation temperature 32° C.).
H. Utilization of citrate: Positive (citrate agar for bacilli).
I. Reduction of nitrate to nitrite: Strong.
J. Anaerobic production of gas from nitrate: Negative.
K. Reduction of methylene blue: Positive.
L. Production of indole: Negative.
M. Production of hydrogen sulfide: Positive.
N. Catalase activity: Positive.
O. Urease activity: Negative.
P. Hydrolysis of cellulose (McBeth's medium): Negative.
Q. Temperatures of growth: Good growth at 28° C. to 35° C., maximum temperatures usually between 40° C. and 44° C., no growth at 45° C. or higher, slight growth at 8° C. after five days' culture.
R. pH for growth: Optimum pH between 7.0 and 8.5, and no growth at pH 5.0 or less.
S. Fermentation tests: Acid but no gase (with ammonium salts as source of nitrogen) from glucose, fructose, galactose, mannose, sucrose, maltose, trehalose, cellobiose, starch, dextrin, glycogen, glycerol, mannitol and salicin. No acid from arabinose, rhamnose, xylose, lactose, melibiose, raffinose, melezitose, inulin, sorbitol, dulcitol, inositol and α-methyl glucoside.

III. Source: Isolated from soil at Tottori Prefecture, Japan.

*Bacillus Megaterium* var. *Noncitrovorum*

I. Morphological observations:
A. Microscopic observations:
(a) Vegetative cells—When grown on nutrient agar at 30° C. for 18 to 24 hours, rods, 1.0μ to 1.1μ by 3.0μ to 7.0μ, usually occurring singly or in short chains, but a few cells observed as filaments or long and tangled chains. Motile with flagella, Gram positive, no capsules. On glucose-nutrient agar, numerous large fat globules contained in cell. Stained protoplasm granular. Occasional shadowforms.
(b) Spores—Numerous spores are formed on soybean agar at 30° C. for 24 to 48 hours, 1.0μ to 1.2μ by 1.5μ to 2.2μ, oviform or ellipsoidal, central or para-central.
(c) Sporangia—Not distinctly swollen.
B. Nutrient agar slants stroke: Growth abundant, filiform, smooth, soft to butyrous, slightly adherent, translucent to opaque, glistening, white to slightly yellowish white, chromogenesis unchanged on aging, no browning with pellucid dots on aging; color of medium unchanged, putrid odor.
C. Nutrient agar plate colonis: Circular, smooth, soft, glistening, convex, entire, translucent to opaque, no spreading, white to slightly yellowish white, slightly adherent.
D. Nutrient broth: Turbidity medium to heavy, uniform, with sediment, no pellicle (30° C., 24 hour growth).
E. Glucose-nutrient agar slants: Growth usually more abundant (somewhat slimy) and softer than on nutrient agar.
F. Glucose-nitrate agar slants (30° C., 24 to 72 hours): No growth.
G. Tyrosine agar slants (30° C., 24 hours): Deep black pigment produced.
H. Soybean agar slants (30° C., 24 hours): Growth abundant, better sporulation than on nutrient agar.
I. Potato plug (30° C., 24 hours): Growth abundant, smooth, soft to slimy, glistening, white to yellowish white (but yellow on aging occasionally). Color of medium becomes yellowish brown on aging.
J. 7% NaCl broth: No growth.
K. 5% NaCl broth: No growth or scant growth.

II. Physiological properties (incubation temperature usually 30° C.):
A. Oxygen: Aerobic (anaerobic growth in glucose broth: negative).
B. Litmus milk: Production of alkalinity; begins to peptonize at 15 days.
C. Gelatin stab: Slow liquefaction, crateriform (hydrolysis of gelatin: Positive).
D. Gelatin agar streak plate: Wide zone of hydrolysis (Frazier gelatin agar plate).
E. Milk agar streak plate: Wide zone of hydrolyzed casein (hydrolysis of casein: Positive).
F. Hydrolysis of starch: Positive.
G. Production of acetylmethylcarbinol: Negative (incubation temperature 32° C.).
H. Utilization of citrate: Negative (citrate agar for bacilli).
I. Reduction of nitrate to nitrite: Positive (weakly).
J. Anaerobic production of gas from nitrate: Negative.
K. Reduction of methylene blue: Positive.
L. Production of hydrogen sulfide: Positive.
M. Production of indole: Negative.
N. Catalase activity: Positive.
O. Urease activity: Negative.
P. Hydrolysis of cellulose: Negative (McBeth's medium).
Q. Temperatures for growth: Good growth at 28° C. to 35° C., maximum temperatures usually between 40° C. and 44° C., no growth at 45° C. or higher, slight growth at 8° C. after five days' culture.
R. pH for growth: Optimum pH between 7.0 and 8.5; no growth at pH 5.0 or less.
S. Fermentation tests: Acid but no gas (with ammonium salts as source of nitrogen) from arabinose, glucose, fructose, sucrose, maltose, trehalose, cellobiose, starch, dextrin, glycogen, glycerol, mannitol and salacin. Slightly acid from galactose. No acid from rhamnose, xylose, mannose, lactose, melibiose, raffinose, melezitose, inulin, sorbitol, dulcitol, inositol and α-methyl-glucoside.

III. Source: Isolated from soil at Tottori district in Japan.

To prepare 6-aminopenicillanic acid in accordance with the process of this invention, enzymes from one of the strains of *Bacillus megaterium* described hereinbefore is permitted to act on a penicillin.

Any penicillin may be employed as the precursor in the preparation of 6-aminopenicillanic acid in accordance with the process of this invention. Such penicillins include, but are not limited to, penicillin G, penicillin F, penicillin X, penicillin K, penicillin O, penicillin V, 2-(phenylthio)-ethyl-penicillin and α-phenoxyethyl penicillin. The penicillin may be employed as such or, preferably, in the form of a salt, such as a water-soluble salt, as exemplified by the alkali metal salts (e.g., the potassium and sodium salts).

The penicillin is contacted with the enzymes of one of the strains of *Bacillus megaterium* mentioned hereinbefore. The enzymes can be those in the cells of the desired microorganism and/or the enzymes released into the medium from the cells. The enzyme activity is obtained by growing the desired microorganism in a nutrient medium for a sufficient time. On separating the cells from the medium, as by filtration or centrifugation, the enzyme activity is found mainly in the medium, rather than the cells.

In accordance with the preferred method of this invention, the desired microorganism is grown in contact with a suitable nutrient medium in the presence of air. A suitable nutrient medium essentially comprises a source of nitrogenous factors and an assimilable source of carbon and energy. The latter may be a carbohydrate (such as glucose, fructose, sucrose, maltose, starch, glycerine or dextrin). The source of nitrogenous factors may be organic (e.g., soybean meal, corn steep liquor, meat extract, distillers' solubles, peptones and/or yeast extract) or synthetic (i.e., composed of simple, synthesizable organic and inorganic compounds, such as ammonium salts, alkali nitrates, or amino acids). The microorganism is grown at a suitable temperature, such as from about 25° C. to about 37° C. for a suitable period of time, preferably about one to three days, in the presence of a source of oxygen, such as by shaking while exposing to air.

Although the culture may be used directly for the hydrolysis of the penicillins, in the preferred process of this invention the cells are removed, preferably by centrifuging the culture medium, optimally for five to twenty minutes on a 5,000 r.p.m. to 12,000 r.p.m. centrifuge, and the supernatant liquid, containing the major portion of the penicillin amidase, is used as the source of enzyme. This supernatant liquid can be used directly after dilution with an aqueous buffer, such as a boric acid buffer solution, in which case the penicillin is added, preferably in the form of a water-soluble salt, to the thus treated supernatant liquid; or the supernatant liquid can be further purified as by dialysis prior to the addition of the buffer and penicillin. The hydrolysis can be carried out at any normal temperature and pH. However, to ensure that the enzyme and penicillin are not destroyed, the reaction is preferably conducted at a temperature less than about 55° C., and optimally about 37° C. to 38° C., and a pH in the range of about 6 to about 10 (preferably about 7.8 to 8.4).

The 6-aminopenicillanic acid formed can then be recovered in the usual manner, as by adsorption on active carbon or an ion-exchange resin [e.g., a strongly acidic ion exchange resin, such as IR–120 (H+)], elution with a base (e.g., ammonium hydroxide at pH 7), concentration of the eluate in vacuo and adjustment of the pH to 4.4 to obtain the crystalline product; or it may be reacted in situ with a desired acylating agent to give a penicillin the same or different from that from which the 6-aminopenicillanic acid was initially prepared.

The fact that penicillins can be hydrolyzed to 6-aminopenicillanic acid in near quantitative yields by enzymes obtained from the two strains of *Bacillus megaterium* of this invention is surprising in view of the fact that known strains of *Bacillus megaterium* do not yield any 6-aminopenicillanic acid. Thus, when experiments were conducted with the three known strains of *Bacillus megaterium* identified in the American Type Culture Collection by the numbers: 89, 8245 and 10778, it was found that no 6-aminopenicillanic acid was obtained.

The following examples illustrate the invention (all temperatures being in centigrade):

Example 1

(a) *Fermentation.*—Ten 500 cc. shaking flasks, each containing 100 cc. of the following aqueous medium: polypeptone 1%; meat extract, 1%; and NaCl, 0.5%, are adjusted to pH 7 and autoclaved. After cooling, each flask is inoculated with one platinum wire loop of a meat extract agar slant culture of *Bacillus megaterium* ATCC 14945. The flasks are then cultivated for 48 hours at 30° while shaking (6 cm. stroke, 120 r.p.m.).

(b) *Recovery of the enzymes.*—The flasks are pooled and centrifuged in a 4,000 r.p.m. centrifuge to yield about 850 cc. of supernatant liquid. To this liquid is added 1,000 cc. of a boric acid buffer solution (pH 8.2) and 150 cc. of toluol.

(c) To the liquid obtained in step b is added an aqueous solution of one billion units of penicillin G in its potaasium salt form. The resulting mixture is left for five hours at 37°, while being shaken occasionally. After the reaction, the fluid is adjusted to a pH of 2.5 to 2.8 with N HCl and then the residual penicillin is removed by ether extraction. The pH is then adjusted to 6.6 to 7.0 by addition of N NaOH. Part of the liquid is then plotted and developed by paper chromatography using a n-butanol; ethanol; water (5:4:1) system. After air drying, the product is acylated with phenylacetyl chloride and the portion which inhibits the growth of *Staph. aureus* is measured to produce $R_f$ 0.20–0.22, which is exactly equal to the value of $R_f$ of pure 6-aminopenicillanic acid. Moreover, through measurement of resistance to bacteria created by acylation, it is found that the liquid still contains about 3.2 g. of 6-aminopenicillanic acid, which can be made into a dried product through adsorption or dialysis or be turned into synthetic penicillin after being submitted to desired acylation in the adsorbed form.

Example 2

(a) *Fermentation.*—One liter of the following aqueous medium: glucose, 0.5%; glycerine, 0.3%; meat extract, 1.0%; polypeptone, 1.0%, and NaCl, 0.5%, adjusted to pH 7, is added to a small fermenter and autoclaved. After cooling there is added 50 cc. of a pre-culture fluid obtained by growing *Bacillus megaterium* ATCC 14946 for 20 hours on the same medium. The resulting mixture is aerated at the ratio of 1:1 and cultivated for 48 hours.

(b) *Recovery of the enzymes.*—The culture obtained in step a is centrifuged in a 4,000 r.p.m. centrifuge to yield 1,000 cc. of supernatant liquid. This liquid is saturated 80% with ammonium sulfate and the resulting precipitate is dissolved in distilled water while the pH is adjusted to 8.0 to 8.4 by addition of ammonia water. The resulting solution is filled into a cellophane bag and dialyzed for 20 hours in running tap water and another 30 hours in running distilled water to produce 300 cc. of dialytic inner liquid.

(c) *Hydrolysis of penicillin G to 6-aminopenicillanic acid.*—To the 300 cc. of liquid obtained in step b is added 375 cc. of boric acid buffer solution, 30 cc. toluol and 2.12 g. of the potassium salt of penicillin B. The mixture is allowed to react for five hours at 37° with occasional shaking. The initial penicillin concentration is 5,000 units per cc. After five hours the residual penicillin amounts to 150 units per cc., which corresponds to a 97% conversion to 6-aminopenicillanic acid. This is confirmed by the recovery of 1.1 g. of 6-aminopenicillanic acid.

Example 3

(a) *Fermentation.*—550 liters of the following aqueous sterile medium: 3.0% amber enzyme hydrolyzed casein, 0.05% Ucon lubricant LB 625 and 0.5% glucose (separately sterilized), the pH adjusted to 7.0 before and after sterilization for 30 minutes at 121°; is inoculated with 17 liters of a culture of *Bacillus megaterium* ATCC 14945 which has been grown at 30° for 24 hours in the following medium: 4.0% Amber enzyme hydrolyzed casein, 0.05% Ucon lubricant LB 625 and 0.5% glucose, the pH adjusted to 7.0 before and after sterilization for 30 minutes at 121°. The resulting mixture is agitated (0.2 H.P./100 gal.) and aerated for 48 to 72 hours. After about 8 hours, 0.15% phenylacetic acid is added.

(b) *Hydrolysis of penicillin G to 6-aminopenicillanic acid.*—The broth obtained in step a is adjusted to pH 7.3 with sulfuric acid, aeration is stopped, a nitrogen overlay is provided, 0.2% toluene is added and the temperature is raised to 35°. Then 15 g./liter of potassium benzylpenicillin is added. The pH is controlled at 7.3 with sterile sodium hydroxide solution. After 10 to 15 hours, about 65 to 70% of the penicillin G is converted to 6-aminopenicillanic acid.

*Example 4*

(a) *Fermentation.*—The procedure of Example 3, step a, is followed except that a culture of *Bacillus megaterium* ATCC 14946 is used.

(b) *Hydrolysis of penicillin G to 6-aminopenicillanic acid.*—The procedure of Example 3, step b, is followed except that about 30 g./liter of potassium benzylpenicillin is added and the pH is adjusted and controlled at 8.5. After 3 to 6 hours, about 65 to 70% of the penicillin G is converted to 6-aminopenicillanic acid.

*Example 5*

(a) *Fermentation.*—One liter of the following aqueous sterile medium: 4.0% Amber enzyme hydrolyzed casein, 0.05% Ucon lubricant LB 625, 0.5% glucose, 0.15% phenylacetic acid, the pH adjusted to 7.0 before and after sterilization for 30 minutes at 121°; is inoculated with a culture of *Bacillus megaterium* ATCC 14945, which has been grown at 30° for 24 hours in the following medium: 4.0% Amber enzyme hydrolyzed casein, 0.05% Ucon lubricant LB 625 and 0.5% glucose, the pH adjusted to 7.0 before and after sterilization for 30 minutes at 121°. The resulting mixture is agitated and aerated for 70 hours. The broth is then centrifuged and the broth supernatant fluid is recovered.

(b) *Hydrolysis of penicillin V to 6-aminopenicillanic acid.*—0.5 ml. of the supernatant fluid is added to 0.5 ml. of a 0.2 M borate buffer, pH 8.6, containing 2 mg. of penicillin V. The mixture is incubated at 37° for two hours, a 0.06 ml. aliquot is applied on Whatman No. 1 filter paper and the paper is developed overnight by butanol:ethanol:water (4:1:5) solvent system. The 6-aminopenicillanic acid produced is detected by bioassay along with the standard developed in the same way and after acylation with phenylacetyl chloride.

*Example 6*

Following the same procedure as Example 5, but substituting 2 mg. of penicillin O for the penicillin V, 6-aminopenicillanic acid is obtained.

*Example 7*

Following the same procedure as Example 5, but substituting 2 mg. of penicillin F for the penicillin V, 6-aminopenicillanic acid is obtained.

*Example 8*

Following the same procedure as Example 5, but substituting 2 mg. of potassium phenethicillin for the penicillin V, 6-aminopenicillanic acid is obtained.

*Example 9*

Following the same procedure as Example 5, but substituting 2 mg. of 2-(phenylthio)ethylpenicillin for the penicillin V, 6-aminopenicillanic acid is obtained.

This invention may be variously otherwise embodied within the scope of the appended claims.

What is claimed is:

1. A process for preparing 6-aminopenicillanic acid, which comprises subjecting a penicillin to the action of enzymes of a microorganism selected from the group consisting of *Bacillus megaterium* var. *penicillalyticum* ATCC 14945 and *Bacillus megaterium* var. *noncitrovorum* ATCC 14946, whereby 6-aminopenicillanic acid is obtained.

2. The process of claim 1 wherein the microorganism is *Bacillus megaterium* var. *penicillalyticum* ATCC 14945.

3. The process of claim 1 wherein the microorganism is *Bacillus megaterium* var. *noncitrovorum* ATCC 14946.

4. The process of claim 1 wherein the penicillin is penicillin G.

References Cited in the file of this patent

UNITED STATES PATENTS

| | | |
|---|---|---|
| 3,014,845 | Rolinson et al. | Dec. 26, 1961 |
| 3,109,779 | Brandl et al. | Nov. 5, 1963 |